US006985614B2

(12) United States Patent
Shinbata

(10) Patent No.: US 6,985,614 B2
(45) Date of Patent: Jan. 10, 2006

(54) IMAGE PROCESSING METHOD, APPARATUS AND PROGRAM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 09/873,340

(22) Filed: Jun. 5, 2001

(65) Prior Publication Data

US 2002/0018590 A1 Feb. 14, 2002

(30) Foreign Application Priority Data

Jun. 6, 2000 (JP) ............................. 2000-168747

(51) Int. Cl.
*G06K 9/00* (2006.01)
(52) U.S. Cl. .................... 382/132; 382/190; 378/92
(58) Field of Classification Search ........ 382/128–134, 382/162, 168, 190, 125, 169, 198, 237; 378/63, 378/96, 6, 46, 90, 92, 98.4, 98.6, 98.9, 101, 378/140; 600/306, 504
See application file for complete search history.

(56) References Cited

U.S. PATENT DOCUMENTS

| 5,285,786 | A | * | 2/1994 | Fujii ........................ 600/425 |
| 5,732,149 | A | * | 3/1998 | Kido et al. ................. 382/128 |
| 5,740,267 | A | * | 4/1998 | Echerer et al. ............. 382/132 |
| 5,854,851 | A | * | 12/1998 | Bamberger et al. ......... 382/132 |
| 5,954,796 | A | | 9/1999 | McCarty et al. ............ 709/222 |
| 5,982,848 | A | * | 11/1999 | Friedrich et al. ............ 378/96 |
| 6,415,049 | B1 | * | 7/2002 | Yanagita et al. ............ 382/132 |
| 6,502,984 | B2 | * | 1/2003 | Kawasaki et al. .......... 378/206 |

FOREIGN PATENT DOCUMENTS

JP 10243020 9/1998

\* cited by examiner

*Primary Examiner*—Kanjibhai Patel
*Assistant Examiner*—Abolfazl Tabatabai
(74) *Attorney, Agent, or Firm*—Fitzpatrick, Cella, Harper & Scinto

(57) ABSTRACT

There is disclosed an image processing apparatus in which an optimum characteristic amount for use in an image processing can constantly correctly be extracted from an object image, an optimum image processing can therefore be performed, and a satisfactory image can be outputted. To achieve this, a first extraction section limits a predetermined area from the object image (X-ray image), and extracts a first characteristic amount from the predetermined area. A second extraction section extracts a second characteristic amount from a fixed area of the object image. A selection section selects a characteristic amount for use in a gray scale conversion processing from the first and second characteristic amounts based on a result of comparison of a difference between the first characteristic amount and the second characteristic amount with a predetermined threshold value.

7 Claims, 4 Drawing Sheets

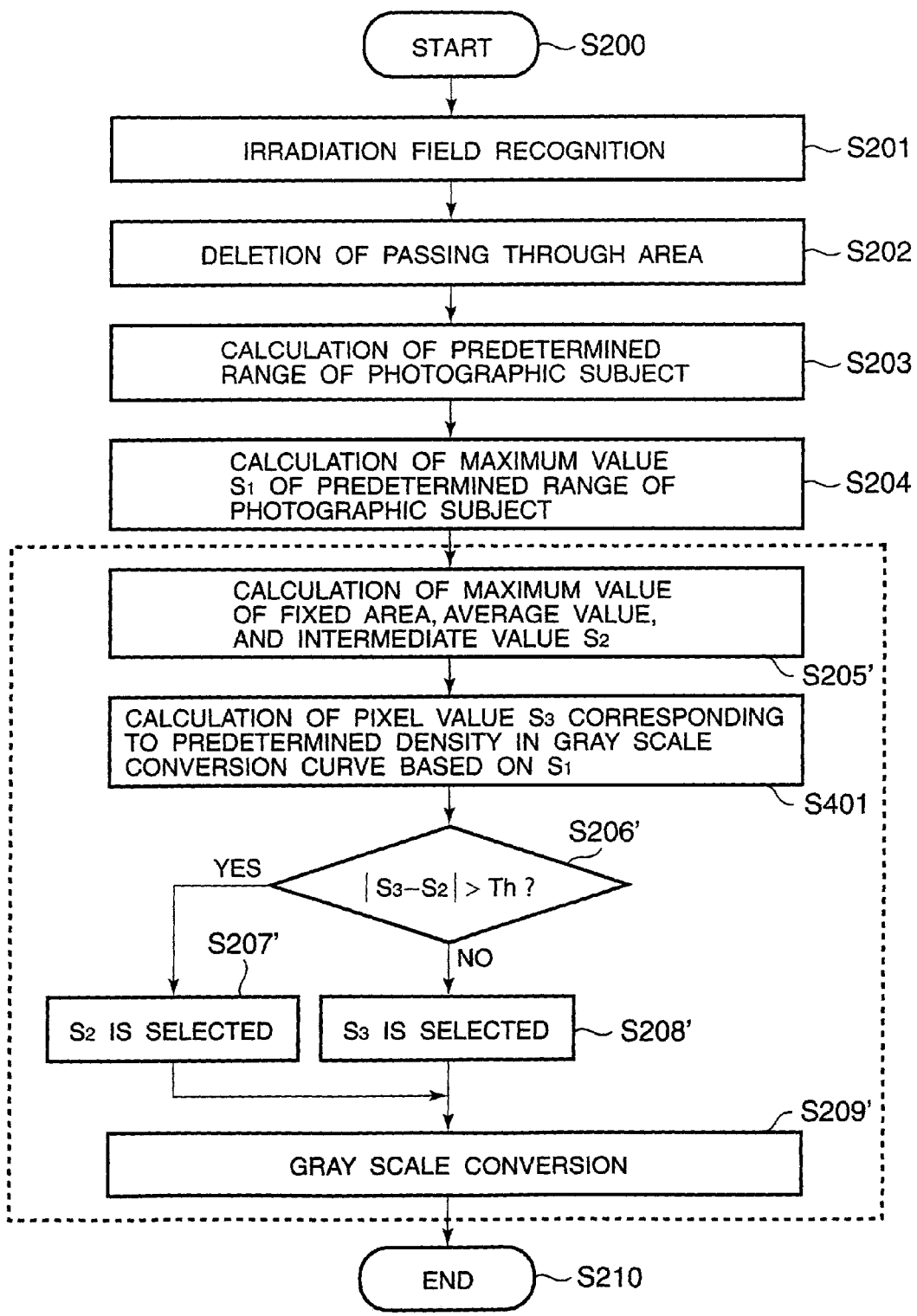

IMAGE PROCESSING METHOD, APPARATUS AND PROGRAM

BACKGROUND OF THE INVENTION

1. Field of the Invention

The present invention relates to an image processing method of extracting a characteristic amount from a photographed image obtained, for example, by radiation (X-ray or the like) photography, and subjecting the photographed image to a gray scale conversion processing based on the characteristic amount.

2. Related Background Art

In recent years, with a progress in a digital technique, for example, a photographed image obtained by X-ray photography is digitized, and the digital image is subjected to an image processing and displayed in a monitor or outputted on a film for X-ray diagnosis.

Examples of the image processing include a gray scale conversion processing for converting a density of the photographed image to a density value at which the image is easily observed in a monitor image, film or another output device.

In the gray scale conversion processing, for example, when the photographed image obtained by photographing a chest with X-ray is outputted onto the film for X-ray diagnosis, first a histogram (pixel value histogram) of all pixels constituting the photographed image is prepared and analyzed. Moreover, a pixel value of a given partial point of the histogram (i.e., a pixel value obtained by subtracting a difference of 5% between a maximum pixel value and a minimum pixel value from the maximum pixel value in a pixel value distribution in the pixel value histogram, or the like) is extracted as the characteristic amount of the photographed image. The pixel value of the photographed image is converted (gray scale conversion) in such a manner that the extracted pixel value (characteristic amount) corresponds to a given density value (density of about 1.9) on the film.

However, in the aforementioned conventional image processing method, when the characteristic amount is extracted by histogram analysis, the pixel value of the given partial point (higher 5% point or the like) of the histogram is extracted as the characteristic amount. However, the pixel value of the given partial point is often a pixel value in an area of a portion different with a photographic subject.

Concretely, for example, a characteristic amount extracted from a predetermined portion in a lung is most appropriate in the photographed image of the chest (the extracted characteristic amount corresponds to the pixel value of the predetermined portion in the lung). However, the characteristic amount is extracted from a higher portion in the lung (corresponds to the pixel value of the higher portion in the lung) or the characteristic amount is extracted from a soft tissue portion (corresponds to the pixel value of the soft tissue portion) depending upon the photographic subject. Moreover, when a plaster cast is added to the photographic subject, the characteristic amount is extracted from another unrelated portion (corresponds to the pixel value of another unrelated portion) in some case.

As described above, in the conventional art, even when the pixel value of the given partial point of the histogram is extracted as the characteristic amount, the extraction area of the characteristic amount differs with each photographic subject. Therefore, even when the gray scale conversion processing is performed based on the characteristic amount extracted from the photographed image, a dispersion of density distribution is generated in each processed image. If the image subjected to the gray scale conversion and having the dispersion in the density distribution is used to perform diagnosis, a diagnosis mistake is possibly caused. This raises a very large problem.

SUMMARY OF THE INVENTION

The present invention has been developed to solve the aforementioned problem, and an object thereof is to provide an image processing apparatus, system, method, and program in which an optimum characteristic amount for use in an image processing can constantly exactly be extracted from an object image, an optimum image processing can therefore be performed, and a satisfactory image can be outputted.

To achieve the aforementioned object, according to the present invention, there is provided an image processing method comprising: an input step of inputting image data obtained by photographing a photographic subject; a first extraction step of analyzing the image data and extracting a characteristic amount in an anatomic area in a photographic subject image; a second extraction step of extracting the characteristic amount in a preset area in the photographic subject image; a setting step of setting the characteristic amount in the photographic subject image based on a relation between the characteristic amount obtained by the first extraction step and the characteristic amount obtained by the second extraction step; and an image processing step of performing an image processing by using an image processing condition based on the characteristic amount set by the setting step.

According to the present invention, there is also provided an image processing method for extracting a characteristic amount for use in a gray scale conversion processing from an object image, comprising: an extraction step of extracting a plurality of characteristic amounts from the object image; and a selection step of selecting the characteristic amount for use in the gray scale conversion processing from the respective characteristic amounts obtained by the extraction step based on a result of comparison of a difference among the respective characteristic amounts obtained by the extraction step with a predetermined threshold value.

According to the present invention, there is further provided an image processing method for extracting a characteristic amount for use in a gray scale conversion processing from an object image, comprising: an extraction step of extracting at least a first characteristic amount and a second characteristic amount from the object image; and a selection step of selecting the characteristic amount for use in the gray scale conversion processing from at least the first characteristic amount and the second characteristic amount based on a result of comparison of a difference between a pixel value corresponding to a predetermined density value obtained from a gray scale conversion curve defined by the first characteristic amount, and the second characteristic amount, with a predetermined threshold value.

Other objects and characteristics of the present invention will be apparent from the following description and drawings.

BRIEF DESCRIPTION OF THE DRAWINGS

FIG. 5 is a flowchart of the operation of the X-ray photographing apparatus in a second embodiment.

DETAILED DESCRIPTION OF THE PREFERRED EMBODIMENTS

Embodiments of the present invention will be described hereinafter with reference to the drawings.

(First Embodiment)

Figure 1:
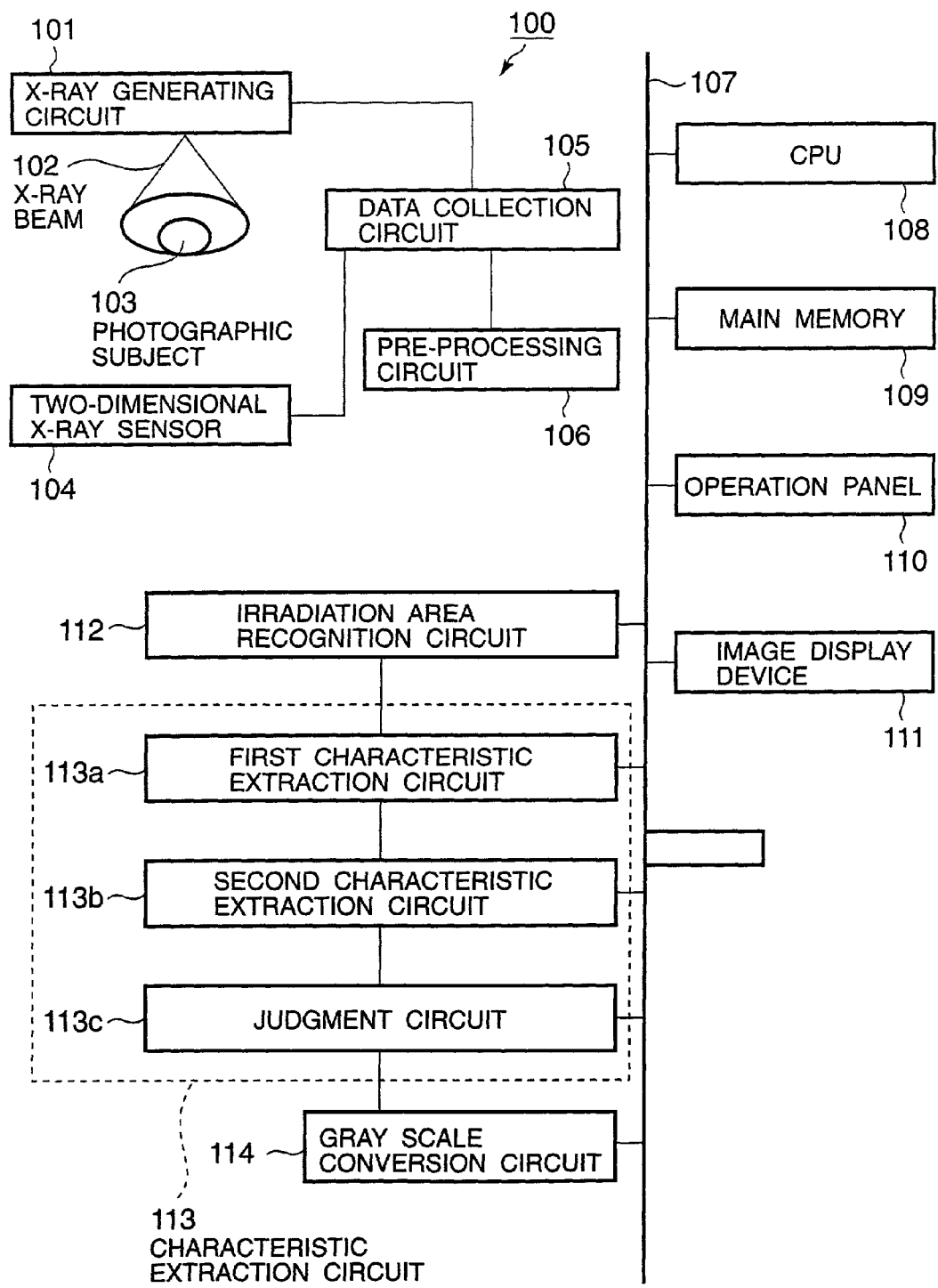
FIG. 1 is a block diagram showing a constitution of an X-ray photographing apparatus to which the present invention is applied in a first embodiment.

In a first embodiment, for example, use of an X-ray photographing apparatus 100 as shown in FIG. 1 will be described.

The X-ray photographing apparatus 100 has an image processing function including a gray scale conversion processing. As shown in FIG. 1, the X-ray photographing apparatus includes: an X-ray generating circuit 101 for generating an X-ray beam 102; a two-dimensional X-ray sensor 104 on which the X-ray beam transmitted through a photographic subject 103 is formed into an image; a data collection circuit 105 for collecting a photographed image outputted from the two-dimensional X-ray sensor 104; a preprocessing circuit 106 for preprocessing the photographed image collected by the data collection circuit 105; a main memory 109 for storing various information of the photographed image (original image) preprocessed by the preprocessing circuit 106 and a processing program for executing various processings; an operation panel 110 for performing an instruction for execution of X-ray photography and various settings for the present apparatus; an irradiation area recognition circuit 112 for extracting an irradiation area from the photographed image (original image) preprocessed by the preprocessing circuit 106; a characteristic extraction circuit 113 for obtaining a characteristic amount of the photographed image based on the irradiation area obtained by the irradiation area recognition circuit 112; a gray scale conversion circuit 114 for using the characteristic amount obtained by the characteristic extraction circuit 113 to subject the photographed image (original image) preprocessed by the preprocessing circuit 106 to the gray scale conversion processing; an image display device 111 for displaying the photographed image subjected to the gray scale conversion processing by the gray scale conversion circuit 114, and the like; and a CPU 108 for performing an operation control of the whole present apparatus. The data collection circuit 105, preprocessing circuit 106, irradiation area recognition circuit 112, characteristic extraction circuit 113, gray scale conversion circuit 114, CPU 108, main memory 109, operation panel 110, and image display device 111 are connected to a CPU bus 107 so that data can mutually be transmitted/received.

Here, the characteristic extraction circuit 113 is constituted to extract a plurality of characteristic amounts from the photographed image so that the characteristic amount for use in the gray scale conversion processing can be selected from the characteristic amounts. This is a most characteristic constitution in the present embodiment. Here, to facilitate the description, it is assumed that two characteristic amounts, that is, first and second characteristic amounts are extracted from the photographed image.

To this end, the characteristic extraction circuit 113 includes a first characteristic extraction circuit 113a for extracting the characteristic amount by analyzing the photographed image, a second characteristic extraction circuit 113b for extracting the characteristic amount from a predetermined area of the photographed image, and a judgment circuit 113c for selecting either one of the characteristic amounts extracted by the first and second characteristic extraction circuits 113a and 113b as the characteristic amount for use in the gray scale conversion processing.

Therefore, the gray scale conversion circuit 114 uses the characteristic amount selected/determined by the judgment circuit 113c to perform gray scale conversion of the photographed image.

Figure 2:
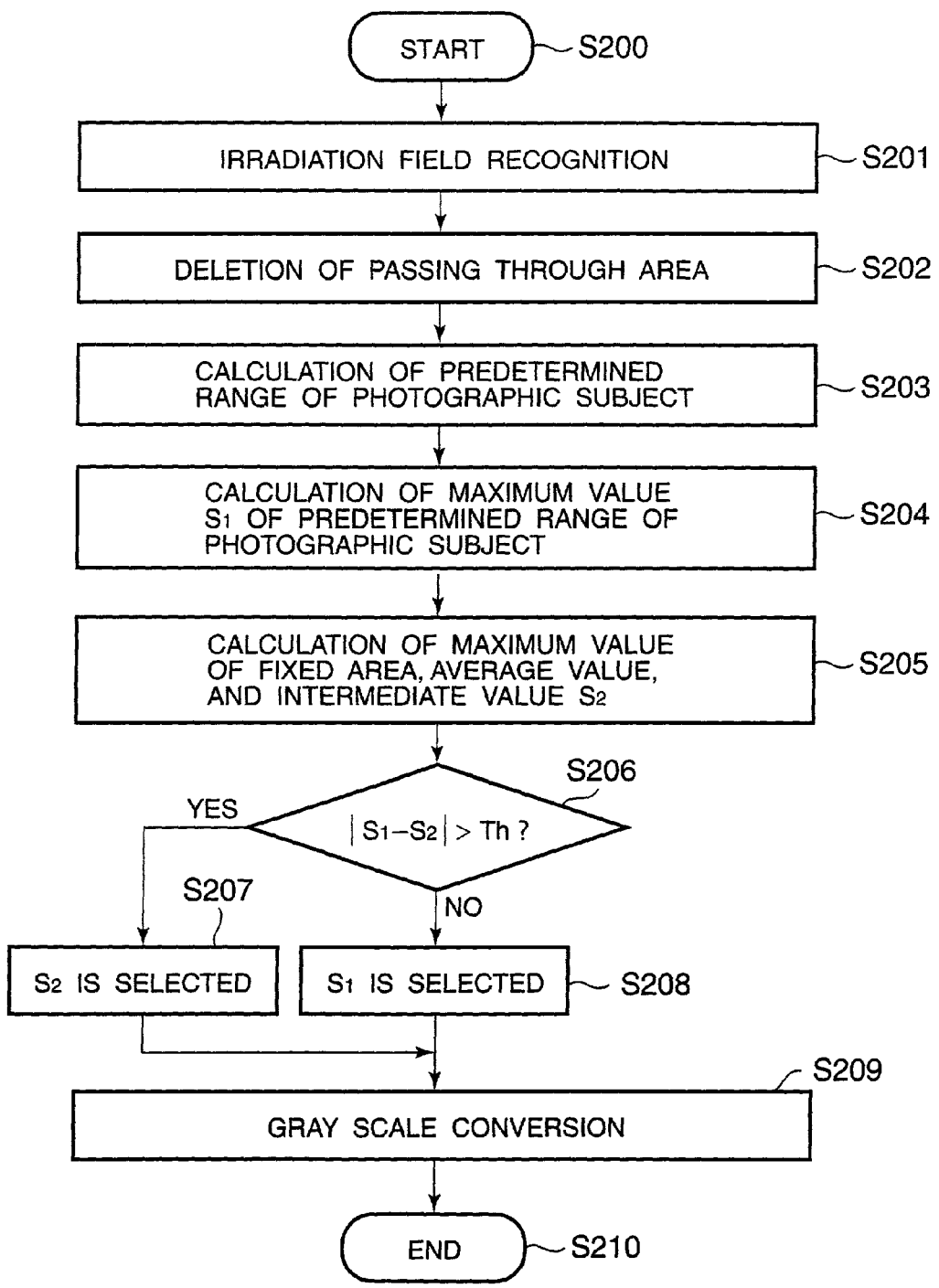
FIG. 2 is a flowchart showing an operation of the X-ray photographing apparatus.

Data, processing program, and the like required for executing various processings in the CPU 108 are stored beforehand in the main memory 109. Furthermore, the main memory 109 includes a work memory for operating the CPU 108. Here, for example, a processing program shown in a flowchart of FIG. 2 is used as the processing program stored in the main memory 109, particularly as the processing program for extracting and selecting the characteristic amount.

The CPU 108 reads and executes the processing program or the like from the main memory 109, and performs the following operation control of the whole present apparatus in accordance with the operation from the operation panel 110.

Step S200:

First, the X-ray generating circuit 101 irradiates the photographic subject 103 with the X-ray beam 102. The X-ray beam 102 emitted from the X-ray generating circuit 101 decays and passes through the photographic subject 103, reaches the two-dimensional X-ray sensor 104, and is outputted as an X-ray image by the two-dimensional X-ray sensor 104.

Figure 3:
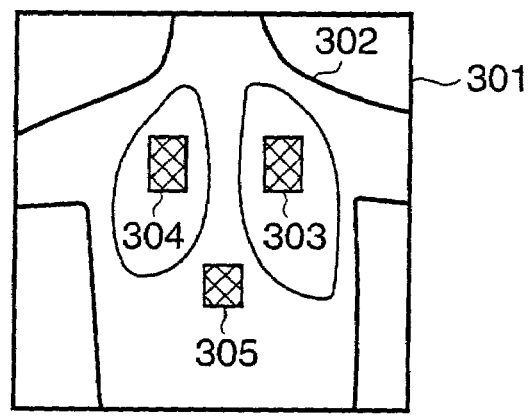
FIG. 3 is an explanatory view of one example of a photographed image as a processing object in the X-ray photographing apparatus.

Here, the X-ray image outputted from the two-dimensional X-ray sensor 104 is, for example, a lung front image 300 as shown in FIG. 3. In FIG. 3, reference numeral 302 denotes the photographic subject, and 303 to 305 denote fixed areas from which the second characteristic amount is extracted as described later.

Additionally, the fixed areas 303 to 305 shown in FIG. 3 are, for example, predetermined areas corresponding to positions of X-ray detection sensors for auto exposure control disposed in the vicinity of the two-dimensional X-ray sensor 104, that is, photo timers (not shown), but are not limited to the areas.

Subsequently, the data collection circuit 105 converts the X-ray image outputted from the two-dimensional X-ray sensor 104 to a predetermined electric signal, and supplies the signal to the preprocessing circuit 106.

The preprocessing circuit 106 subjects the signal (X-ray image signal) from the data collection circuit 105 to preprocessings such as an offset correction processing and gain correction processing.

The X-ray image signal preprocessed by the preprocessing circuit 106 is transferred as information of the input image to the main memory 109, irradiation area recognition circuit 112, characteristic extraction circuit 113, and gray scale conversion circuit 114 via the CPU bus 107 by the control of the CPU 108.

Step S201:

The irradiation area recognition circuit 112 uses an arbitrary method (e.g., a method described in Japanese Patent Application No. 243020/1998 (U.S. patent application Ser. No. 287406 filed on Apr. 6, 1999), and the like) to extract an X-ray irradiation area from the input image (hereinafter referred to also as "object image" or "original image") transferred by the control of the CPU 108.

The characteristic extraction circuit 113 executes a processing of steps S202 to S208 as described later with respect to the input image (object image) transferred by the control of the CPU 108 based on the irradiation area extracted by the irradiation area recognition circuit 112.

Step S202:

The first characteristic extraction circuit 113a extracts a first characteristic amount S1 from the input image (object image) transferred by the control of the CPU 108.

Concretely, first the first characteristic extraction circuit 113a replaces the outside of the irradiation area extracted by the irradiation area recognition circuit 112, a passing through area (area directly irradiated with the X-ray beam) and a subject area in contact with the passing through area in a given interval, for example, with a pixel value="0" in the object image. That is, the area outside the irradiation area extracted by the irradiation area recognition circuit 112 is replaced with the pixel value="0" in the object image.

Subsequently, for the image data obtained by replacing the area other than the irradiation area with the pixel value="0", the image is converted by the following equation (1) in which the image data is "f(x, y)", the passing through area and the subject area in contact with the passing through area within the given interval are deleted, and image data f1(x, y) (i.e., the image data replaced with the pixel value="0") is obtained.

$$f1(x, y) = f(x, y) X \prod_{x1=-d1}^{x1=d1} \prod_{y1=-d2}^{y1=d2} sgn(x + x1, y + y1) \quad (1)$$

Here, "sgn (x, y)" in the equation (1) is represented by the following equation (2).

$sgn\ (x, y)=0$ for $f(x, y) \geq Th1$ $sgn\ (x, y)=1$ in other cases     (2)

Moreover, "Th1" in the equation (2) is a constant predetermined by an experiment or the like and is, for example, 95% of a maximum pixel value of the input image (original image). Moreover, "d1" and "d2" are constants for determining the given interval (width) when the subject area in contact with the passing through area in the given interval is deleted.

Step S203:

Subsequently, the first characteristic extraction circuit 113a extracts Y coordinate Y0 of an uppermost point and Y coordinate Y3 of a lowermost point of the area having a pixel value other than "0" (hereinafter referred to as "photographic subject area") in the image f1(x, y) obtained by deleting the passing through area in the step S202, and calculates a point Y1 at ¼ from the upper portion of the photographic subject area from the points Y0 and Y3 by the following equation (3).

$Y1=Y0+(Y3-Y0)/4$     (3)

Moreover, the first characteristic extraction circuit 113a calculates a point Y2 at ½ from the upper portion of the photographic subject area from the uppermost point Y0 and lowermost point Y3 of the photographic subject area by the following equation (4).

$Y2=Y0+(Y3-Y0)/2$     (4)

Furthermore, the first characteristic extraction circuit 113a uses the image area whose pixel value is not "0" (image f1(x, y)>0), but "Y1≦y≦Y2" as a predetermined area (anatomic area) from which the first characteristic amount S1 is to be extracted.

Step S204:

Subsequently, the first characteristic extraction circuit 113a calculates the pixel value in the pixel having the maximum value among the pixels of the predetermined area of the photographic subject obtained in the step S203 as the first characteristic amount S1 by the following equation (5).

$s1=\max\{f1(x, y)|Y1 \leq y \leq Y2\}$     (5)

Additionally, the method of obtaining the first characteristic amount S1 in the step S204 is not limited to the method using the equation (5). For example, the pixel values of the predetermined area of f1(x, y)>0 and Y1≦y≦Y2 are sorted in order from the largest pixel value, and the value of a higher 5% point may be obtained as the first characteristic amount S1. Alternatively, an average value of the pixel values up to the higher 5% point may be obtained as the first characteristic amount S1.

Step S205:

On the other hand, the second characteristic extraction circuit 113b extracts a second characteristic amount S2 from any one or all of the fixed areas 303 to 305 (area corresponding to the photo timer positions) shown in FIG. 3. An average value, maximum value, or intermediate value of the pixel values in the area is obtained as the second characteristic amount S2. Here, as one example, the average value of the pixel values of the fixed area 303 is obtained as the second characteristic amount S2.

Step S206:

Here, the first characteristic amount S1 obtained by the first characteristic extraction circuit 113a is extracted from the predetermined area (Y1≦y≦Y2) of the photographic subject area. Therefore, when the first characteristic amount S1 is used to perform the gray scale conversion, a density value or a density distribution of the image subjected to the gray scale conversion can steadily be obtained. However, this fails in some case. For example, when a plaster cast is added to the photographic subject, the characteristic amount inappropriate for use in the gray scale conversion is sometimes extracted.

On the other hand, the second characteristic amount S2 obtained by the second characteristic extraction circuit 113b is securely obtained from the fixed area 303. Therefore, the second characteristic amount is obtained without large failure as long as a noted area of the photographic subject is disposed over the fixed area 303 (the photo timer is disposed in the predetermined position). However, the fixed area 303 is in the upper or lower portion of the lung depending upon the photographic subject. The area sometimes corresponds to a slightly different area for each photographic subject. That is, the area is not limited to the predetermined area of the photographic subject. Therefore, the density value or the density distribution of the image subjected to the gray scale conversion sometimes disperses to some degree among the images.

Therefore, the judgment circuit 113c obtains a difference between the first characteristic amount S1 obtained by the first characteristic extraction circuit 113a and the second characteristic amount S2 obtained by the second characteristic extraction circuit 113b, and judges whether or not an absolute value of the difference is larger than a constant Th.

Additionally, the constant Th is a criterion value for judging whether or not the first characteristic amount S1 obtained from the difference value by the first characteristic extraction circuit 113a is appropriate, and is a constant determined, for example, by an experiment.

Steps S207, S208:

Subsequently, the judgment circuit 113c selects either the first characteristic amount S1 or the second characteristic amount S2 based on a judgment result of the step S206 as shown by the following equation (6)

If $|s1-s2| \geq Th$, $S2$ is selected.

In other cases, $S1$ is selected. (6)

That is, the difference between the first characteristic amount S1 and the second characteristic amount S2 is in a given range, and it is then judged that the extraction of the characteristic amount in the first characteristic extraction circuit 113a does not fail. The first characteristic amount S1 by which the density value or the density distribution of the image subjected to the gray scale conversion becomes stable is selected. On the other hand, the difference between the first characteristic amount S1 and the second characteristic amount S2 is outside the given range, and it is then judged that the extraction of the characteristic amount in the first characteristic extraction circuit 113a fails. Then, the second characteristic amount S2 obtained by the second characteristic extraction circuit 113b is selected because a possibility of a large deviation from the appropriate characteristic amount is low.

In this manner, in the present embodiment, it is judged by comparing the first characteristic amount S1 with the second characteristic amount S2 whether or not the first characteristic amount S1 is correctly extracted. The first characteristic amount S1 is correctly extracted, and the first characteristic amount by which the density value of the image subjected to the gray scale conversion is stabilized is then employed. On the other hand, there is a high possibility that the first characteristic amount S1 is not correctly extracted, and the other second characteristic amount S2 is then employed.

Figure 4:
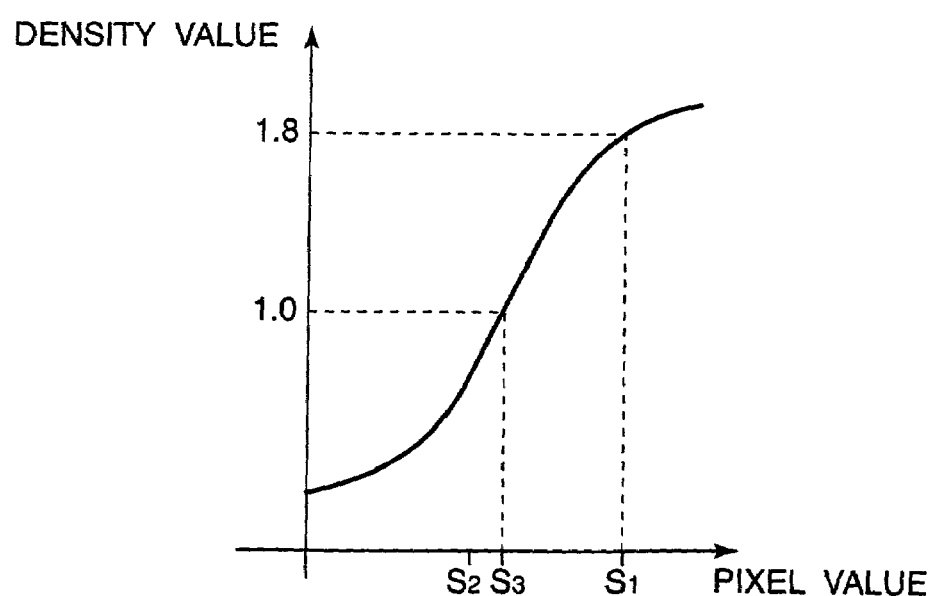
FIG. 4 is an explanatory view of a gray scale conversion curve in a gray scale conversion processing in the X-ray photographing apparatus.

Step S209:

After the characteristic amount is extracted and selected by the characteristic extraction circuit 113 as described above, the gray scale conversion circuit 114 performs a gray scale conversion processing with respect to the input image transferred by the control of the CPU 108. For example, when the characteristic extraction circuit 113 selects the first characteristic amount S1, as shown in FIG. 4, the first characteristic amount S1 corresponds to a density value of "1.8" in the processing.

The image subjected to the gray scale conversion processing by the gray scale conversion circuit 114 is displayed in the image display device 111, or outputted onto the film.

Additionally, "S3" of FIG. 4 will be described later.

As described above, in the first embodiment, two types of characteristic amounts, that is, the first and second characteristic amounts S1 and S2 are extracted from the object image by the different extracting method. According to a result of comparison of the characteristic amounts, the characteristic amount with a lower possibility of failure in extraction of the characteristic amount is employed as the characteristic amount for use in the gray scale conversion processing.

Thereby, since the optimum characteristic amount can constantly be used to perform the gray scale conversion processing, the image subjected to the gray scale conversion processing and constantly having a stable density value can be obtained.

Moreover, when the extraction of the first characteristic amount does not fail, the first characteristic amount is employed. Because the characteristic amount has a property such that the density value or the density distribution of the image subjected to the gray scale conversion is stabilized. When a possibility of failure in the extraction of the first characteristic amount is high, the second characteristic amount with a low possibility of failure in extraction of the characteristic amount is employed. Therefore, since the properties of the respective characteristic amounts can be utilized in a complementary manner, the optimum characteristic amount can be used to perform the gray scale conversion processing.

(Second Embodiment)

In a second embodiment, in the X-ray photographing apparatus 100 of FIG. 1, a pixel value S3 corresponding to a predetermined density value defined for use of the second characteristic amount S2 obtained by the second characteristic extraction circuit 113b is obtained from a gray scale conversion curve defined by the first characteristic amount S1 obtained by the first characteristic extraction circuit 113a. It is judged by comparing the pixel value S3 with the second characteristic amount S2 whether or not the extraction of the first characteristic amount fails. Either the first characteristic amount S1 or the second characteristic amount S2 is employed as the characteristic amount for use in the gray scale conversion processing based on a judgment result.

Therefore, for example, a processing program shown in a flowchart of FIG. 5 instead of the flowchart of FIG. 2 is used here as the processing program for extracting and selecting the characteristic amount.

Therefore, the CPU 108 reads and executes the processing program from the main memory 109 and performs the following operation control of the whole present apparatus in accordance with the operation from the operation panel 110.

Additionally, a step of executing the processing similar to that of each processing step in the flowchart of FIG. 2 is denoted with the same reference numeral in the flowchart of FIG. 5, and a detailed description thereof is omitted. Here, since mainly the processing shown by a dotted part of FIG. 5 is different from the processing of the flowchart of FIG. 2, only the different respect will concretely be described.

Steps S200 to S204:

First, the X-ray photographing operation is started as described above, and the obtained photographed image is supplied to the irradiation area recognition circuit 112, characteristic extraction circuit 113, gray scale conversion circuit 114, and the like via the data collection circuit 105 and preprocessing circuit 106.

Subsequently, in the characteristic extraction circuit 113, the first characteristic extraction circuit 113a calculates the pixel value of the pixel having the maximum value among the pixels in the predetermined area of the photographic subject as the first characteristic amount S1.

Step S205':

The second characteristic extraction circuit 113b obtains, for example, the average value of the pixel values of the fixed area 305 among the fixed areas 303 to 305 shown in FIG. 3 as the second characteristic amount S2.

Step S401:

The judgment circuit 113c defines the gray scale conversion curve as shown in FIG. 4 so that the first characteristic amount S1 obtained by the first characteristic extraction circuit 113a corresponds to a density value of 1.8. Subsequently, when the second characteristic amount S2 obtained in the step S205' is used in the gray scale conversion, the pixel value S3 corresponding to the defined density value (e.g., 1.0) for the second characteristic amount S2 is obtained from the gray scale conversion curve of FIG. 4.

Step S206':

The judgment circuit 113c obtains a difference between the second characteristic amount S2 obtained by the second characteristic extraction circuit 113b and the pixel value S3, and judges whether or not the absolute value of the difference is larger than a constant Th1.

Additionally, the constant Th1 is a constant determined by an experiment or the like.

Steps S207', S208':

Subsequently, the judgment circuit 113c selects either the second characteristic amount S2 or the pixel value S3 (or the first characteristic amount S1) based on the judgment result of the step S206' as shown by the following equation (7).

If $|s3-s2| \geq Th$, $S2$ is selected.

In other cases, $S3$ (or $S1$) is selected.                 ...(7)

That is, the difference between the second characteristic amount S2 and the pixel value S3 is in the given range, it is then judged that the extraction of the characteristic amount in the first characteristic extraction circuit 113a does not fail, and the first characteristic amount S1 or the pixel value S3 is selected. On the other hand, the difference between the second characteristic amount S2 and the pixel value S3 is outside the given range, it is then judged that the extraction of the characteristic amount in the first characteristic extraction circuit 113a fails, and the second characteristic amount S2 is selected.

Step S209'.

The judgment circuit 113c selects the second characteristic amount S2, and the gray scale conversion circuit 114 then performs the gray scale conversion processing with respect to the input image transferred by the control of the CPU 108 so that the second characteristic amount S2 corresponds to a density value of 1.0.

Moreover, the judgment circuit 113c selects the pixel value S3 or the first characteristic amount S1, and the gray scale conversion circuit 114 then performs the gray scale conversion processing with respect to the input image transferred by the control of the CPU 108 so that the pixel value S3 corresponds to a density value of 1.0 or the first characteristic amount S1 corresponds to a density value of 1.8.

As described above, in the second embodiment, the pixel value S3 corresponding to the defined density value in the use of the second characteristic amount S2 is obtained from the gray scale conversion curve defined by the first characteristic amount S1. According to a result of comparison of the pixel value S3 with the second characteristic amount S2, the characteristic amount with a lower possibility of failure in the extraction of the characteristic amount is employed as the characteristic amount for use in the gray scale conversion processing.

Thereby, the values corresponding to the same density value can be compared with each other, and it can therefore be judged with high precision whether or not the first characteristic extraction circuit 113a can appropriately extract the characteristic amount. Therefore, there can be obtained an effect that the satisfactory characteristic amount can constantly be used to perform the gray scale conversion processing, and the image subjected to the gray scale conversion processing can constantly be obtained with the stable density value.

Additionally, two characteristic amount extracting methods are used in the second embodiment, but the number of characteristic amount extracting methods is not limited to two, and a plurality of methods may be used.

Additionally, needless to say, the object of the present invention can also be achieved by supplying a storage medium with a program code of software for realizing functions of a host and terminal of the aforementioned respective embodiments stored therein to a system or an apparatus, and reading and executing the program code stored in the storage medium by a computer (or CPU or MPU) of the system or the apparatus.

In this case, the program code itself read from the storage medium realizes the function of each embodiment, and the storage medium with the program code stored therein constitutes the present invention.

As the storage medium for supplying the program code, for example, a ROM, floppy disk, hard disk, optical disk, optical magnetic disk, CD-ROM, CD-R, magnetic tape, nonvolatile memory card, and the like can be used.

Moreover, it goes without saying that the present invention includes not only the realization of the above-described functions of the respective embodiments by executing the program code read by the computer but also the realization of the above-described functions of the respective embodiments by performing a part or the whole of the actual processing by an OS, and the like operating on the computer based on an instruction of the program code.

Furthermore, it goes without saying that the present invention also includes the realization of the above-described functions of the respective embodiments by writing the program code read from the storage medium into a function expansion board inserted to the computer or a memory disposed in the function expansion unit connected to the computer, and performing a part or the whole of the actual processing by the CPU, and the like disposed in the function expansion board or the function expansion unit based on the instruction of the program code.

According to the aforementioned respective embodiments, it can be judged by comparison of a plurality of characteristic amounts with one another whether or not the extraction of the characteristic amount has failed. Therefore, at failure of the extraction of a certain characteristic amount, another characteristic amount whose extraction does not fail can be employed as the characteristic amount for use in the gray scale conversion processing. Therefore, since the optimum characteristic amount can be extracted for any object image, the gray scale conversion processed image constantly having a stable density value can be obtained.

Modifications of the invention herein disclosed will occur to a person skilled in the art and all such modifications are deemed to be within the scope of the invention as defined by the appended claims.

What is claimed is:

1. An image processing method for executing a gray scale conversion process on an original image, said method comprising:
   a first calculation step of calculating a parameter for determining a gray scale conversion processing method from the original image as a first feature amount value;
   a second calculation step of calculating a parameter for determining the gray scale conversion processing method from the original image as a second feature amount value;
   a selection step of selecting, based on the first feature amount value and the second feature amount value, either the first feature amount value or the second feature amount value; and
   a processing step of executing the gray scale conversion process on the original image based on the selected feature amount value,
   wherein a first calculation method to be used in said first calculation step is different from a second calculation method to be used in said second calculation step.

2. An image processing method according to claim 1, wherein calculation accuracy in the first calculation method is lower than in the second calculation method, and a success frequency of calculation in the first calculation method is higher than in the second calculation method.

3. An image processing method according to claim 1,
   wherein in the first calculation method, a predetermined area in the original image is limited, and the first feature amount value is calculated from the limited predetermined area, and
   wherein in the second calculation method, a subject area is extracted from the original image, and the second feature amount value is calculated from the extracted subject area.

4. An image processing method according to claim 1, wherein said selection step includes selecting the feature amount value based on a difference value of the first feature amount value and the second feature amount value.

5. An image processing method according to claim 1, wherein the original image includes an image obtained by radiation photography.

6. An image processing apparatus for executing a gray scale conversion process on an original image, said apparatus comprising:
   a first calculation unit adapted to calculate a parameter for determining a gray scale conversion processing method from the original image as a first feature amount value;
   a second calculation unit adapted to calculate a parameter for determining the gray scale conversion processing method from the original image as a second feature amount value;
   a selection unit adapted to select, based the first feature amount value and the second feature amount value, either the first feature amount value or the second feature amount value; and
   a processing unit adapted to execute the gray scale conversion process on the original image based on the selected feature amount value,
   wherein a first calculation method to be used by said first calculation unit is different from a second calculation method to be used by said second calculation unit.

7. A computer-readable storage medium storing a computer program for causing a computer to execute an image processing method for executing a gray scale conversion process on an original image, said program comprising:
   code for a first calculation step of calculating a parameter for determining a gray scale conversion processing method from the original image as a first feature amount value;
   code for a second calculation step of calculating a parameter for determining the gray scale conversion processing method from the original image as a second feature amount value;
   code for a selection step of selecting, based on the first feature amount value and the second feature amount value, either the first feature amount value or the second feature amount value; and
   code for a processing step of executing the gray scale conversion process on the original image based on the selected feature amount value,
   wherein a first calculation method to be used by said code for the first calculation step is different from a second calculation method to be used by said code for the second calculation step.

* * * * *

UNITED STATES PATENT AND TRADEMARK OFFICE
CERTIFICATE OF CORRECTION

PATENT NO. : 6,985,614 B2  Page 1 of 1
APPLICATION NO. : 09/873340
DATED : January 10, 2006
INVENTOR(S) : Hiroyuki Shinbata It is certified that error appears in the above-identified patent and that said Letters Patent is hereby corrected as shown below:

[56] REFERENCES CITED

U.S. Patent Documents
"6,502,984 B2* 1/2003 Kawasaki et al. … 378/206" should read
--6,502,984 B2*1/2003 Ogura et al. … 378/206--.
Foreign Patent Documents
"JP 10243020 9/1998" should read --JP 10-243020 9/1998--.

COLUMN 6

Line 49, "case." should read --cases.--.

COLUMN 8

Line 11, "employed. Because" should read --employed because--.

COLUMN 12

Line 8, "based the" should read --based on the--.

Signed and Sealed this

Fifteenth Day of August, 2006

JON W. DUDAS
*Director of the United States Patent and Trademark Office*